(12) United States Patent
Sauder

(10) Patent No.: US 6,612,378 B2
(45) Date of Patent: Sep. 2, 2003

(54) ONE-PASS TILLAGE IMPLEMENT AND METHOD FOR IMPROVING CROP ROOT DEVELOPMENT, PLANT HEALTH AND CROP YIELDS

(76) Inventor: Gregg A. Sauder, 23207 Townline Rd., Tremont, IL (US) 61568

( * ) Notice: Subject to any disclaimer, the term of this patent is extended or adjusted under 35 U.S.C. 154(b) by 8 days.

(21) Appl. No.: 09/682,346

(22) Filed: Aug. 22, 2001

(65) Prior Publication Data

US 2003/0037935 A1 Feb. 27, 2003

(51) Int. Cl.$^7$ ............................................... A01B 49/02
(52) U.S. Cl. ...................... 172/145; 172/149; 172/151; 172/177; 172/179; 172/180; 172/187; 172/197; 172/200; 172/554
(58) Field of Search .......................... 172/72, 145, 146, 172/149, 150, 151, 152, 153, 170, 172, 174, 175, 176, 177, 179, 180, 184, 185, 187, 189, 195, 197, 199, 200, 314, 554

(56) References Cited

U.S. PATENT DOCUMENTS

| | | | | |
|---|---|---|---|---|
| 2,161,705 A | * | 6/1939 | Haines | 172/200 |
| 2,259,828 A | * | 10/1941 | Mowers | 172/200 |
| 4,212,254 A | * | 7/1980 | Zumbahlen | 172/200 X |
| 4,361,191 A | | 11/1982 | Landoll et al. | 172/146 |
| 4,595,064 A | * | 6/1986 | Anderson | 172/200 X |
| 5,000,270 A | | 3/1991 | Phillips | 172/540 |
| 5,020,604 A | | 6/1991 | Peck | 172/177 |
| 5,622,227 A | | 4/1997 | McDonald | 172/146 |
| 5,794,712 A | | 8/1998 | Phillips | 172/459 |

OTHER PUBLICATIONS

Copy 4–page brochure entitled McFarlane Spiral Reel Stalk Chopper—by McFarlane Mfg. Co. Inc., Date unknown.

* cited by examiner

*Primary Examiner*—Christopher J. Novosad
(74) *Attorney, Agent, or Firm*—Larkin, Hoffman, Daly & Lindgren, Ltd.; Thomas J. Oppold, Esq.

(57) ABSTRACT

A one-pass field tillage implement and method which maintains a uniform soil density throughout the crop root zone for greater root development, improved plant health and greater yields by eliminating tillage of the soil at seed planting depths. The implement includes a wheeled frame operably supporting at least three longitudinally spaced tillage tool assemblies which first chops crop surface residue, then aggressively lifts and redistributes the chopped surface crop residue and breaks up the soil surface crust, and then levels the soil so that the soil surface is substantially smooth and ready for planting, all in a single-pass without tilling the soil at seed planting depths.

28 Claims, 14 Drawing Sheets

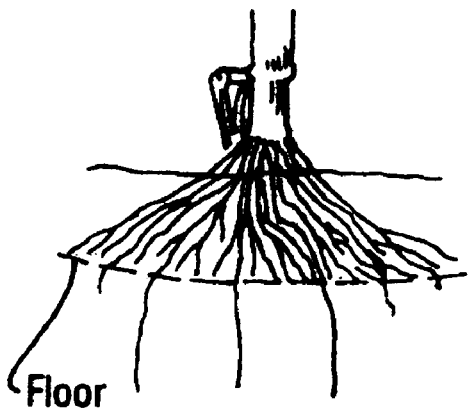
Root Development with Traditional Tillage Tools
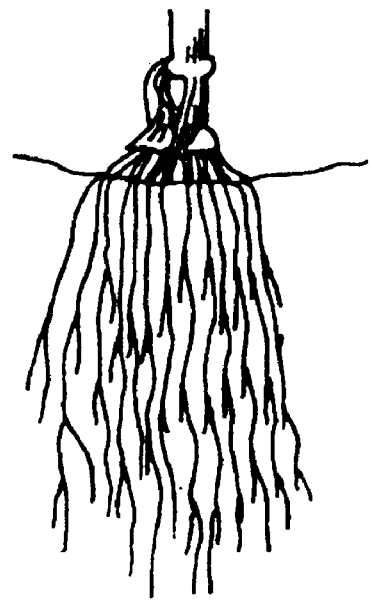
Root Development with the Present Invention
*Fig. 14*

ONE-PASS TILLAGE IMPLEMENT AND METHOD FOR IMPROVING CROP ROOT DEVELOPMENT, PLANT HEALTH AND CROP YIELDS

BACKGROUND OF INVENTION

1. Field of the Invention

The present invention relates generally to agricultural field tillage implements and their method of use, and more particularly to a one-pass tillage implement for preparing a seedbed for planting which eliminates soil density changes for greater root development, improved plant health and greater yields.

2. Background of the Invention

A properly prepared seedbed is essential for good crop yields. There are various types of tillage implements currently being used by crop producers for seedbed preparation. Most tillage implements used for seedbed preparation utilize traditional soil working tools such as discs, sweeps or shanks, alone or in combination, in varying arrangements. While each of these different soil working tools performs the intended purpose for which they were designed, most tillage implements which utilize the above mentioned traditional soil working tools actually hinder proper root development, which in turn results in poorer plant health and lower crop yields.

For example, traditional field cultivator implements with traditional cultivator sweeps lift and fluff the top three to four inches of soil, leaving an untilled "floor" below that depth. As the roots begin to emerge and grow in the three to four inches of loose top soil, the early roots are able to grow larger in diameter. However, as the crop root system continues to develop, these larger diameter roots eventually begin to hit the denser soil of the untilled floor. Unable to penetrate the denser soil of the floor, the larger diameter roots travel along the floor of the tillage layer seeking a crack or a path in which to grow deeper. Eventually, the larger diameter roots are forced to grow smaller in diameter in order to enter the cracks and penetrate the more dense soil of the floor. Thus, crops that are planted in seedbeds prepared by traditional soil working tools and methods are more susceptible to wind damage since the crops are anchored in the deeper soil by only a few smaller diameter roots that managed to penetrate the floor or enter cracks in the floor.

Therefore, it is desirable to provide a seedbed with uniform soil density throughout the entire depth of the root system. When roots develop in a seedbed with uniform density, the roots will maintain their diameter and grow down rather than out along a tillage layer. Roots that grow deeper while maintaining their diameter not only create a stronger anchor to resist wind damage, but result in improved plant health and greater yields.

While an ideal situation may be a seedbed of less dense soil throughout the entire root zone, it is inefficient and impractical to till the soil deep enough to ensure a uniform soil density throughout the root zone of most crops. In addition, even if such a tillage system was available, in order to till the soil at such depths, the soil conditions would have to be ideal. Unfortunately, due to weather patterns and the limited time frame in which crops must be planted to ensure harvest before winter, producers do not have time to wait for ideal soil conditions before beginning planting.

Eliminating seedbed tillage is the ideal solution to creating a seedbed with uniform soil density. If the seedbed is not tilled, the emerging roots will develop through uniform soil density. Though the early roots developing in denser, untilled soils may not be as initially large as roots developing in tilled loose soil, these roots will maintain their diameter and grow down rather than along a tillage layer, thereby creating a stronger stand of crop able to resist wind damage. While it may be desirable to eliminate tillage of the seedbed altogether, it is often desirable, and at times even necessary, to cut, chop and redistribute surface crop residue remaining from the previous year's crop and to break up the soil surface crust that develops over the winter months so that the soil starts to dry more rapidly and warm more quickly. This is true particularly in wet springs.

Based on the foregoing, it is evident that there is a need for an improved tillage implement which, in one-pass, will cut, chop and redistribute crop surface residue without tilling the soil at seed planting depths, but yet breaks up the hard crust at the soil surface and further provides a level soil surface ready for planting. A tillage implement manufactured by McFarlane Manufacturing Co., Inc., of Sauke City, Wis., known as the Spiral Reel Stalk Chopper provides at least some of these desirable features, but lacks a system to aggressively lift and distribute the chopped crop surface residue and to thoroughly break up the hard soil crust.

Specifically, the McFarlane tillage implement is a single-pass tillage implement. It includes spiral reel harrow assemblies comprised of five hardened steel blades to cut and chop heavy crop stubble at ground level. Additionally, because the spiral reel harrow only penetrates the top one or two inches of the soil surface, it does not till the soil at seed planting depths, thereby maintaining the desired uniform density of the soil at seed depth. Disposed behind the spiral reel harrow is a five-bar flexible spike-tooth harrow that is designed to stir, level and firm the soil loosened by the spiral reel. Disposed behind the spike-tooth harrow is a trailing leveling board to level the soil. Accordingly, the spiral reel of the McFarlane implement provides the desirable features of cutting and chopping the crop surface residue while maintaining uniform soil density at seed depth, and further provides a means to level the soil. However, the five-bar flexible spike-tooth harrow of the McFarlane implement fails to aggressively lift and distribute the chopped crop surface residue and to thoroughly break up the hard soil crust.

It is known that a "prickle chain" harrow or a "spider wheel" rotary harrow will aggressively lift and redistribute crop surface residue and will aggressively break up soil surface crusts. U.S. Pat. No. 5,000,270 and U.S. Pat. No. 5,794,712 disclose a tillage implement utilizing a prickle chain harrow. However, these and other prior art references fail to teach combining the advantages and features of a prickle chain harrow or a spider wheel rotary harrow with a crop surface residue chopping tool and a leveling tool.

Accordingly, there is a need for tillage tool which will chop crop surface residue, aggressively lift and redistribute the chopped surface crop residue, and then level the soil so that the soil surface is substantially smooth and ready for planting, all in a single-pass.

SUMMARY OF INVENTION

A preferred embodiment of the present invention is a one-pass field tillage implement comprising a wheeled frame having a longitudinal axis and a transverse axis and adapted to be pulled by a prime mover. The wheeled frame operably supports at least three longitudinally spaced tillage tool assemblies which will chop crop surface residue, aggressively lift and redistribute the chopped surface crop residue, and then level the soil so that the soil surface is substantially smooth and ready for planting, all in a single-pass.

The first tillage tool assembly is preferably a rotary spiral reel disposed substantially transverse to the longitudinal axis of the frame and adapted to cut and chop crop surface residue as the tillage implement is pulled through the field. The second tillage tool assembly is preferably a prickle chain harrow, or, alternatively a rotary spider wheel harrow disposed longitudinally rearward of the first tillage tool assembly and adapted to penetrate and loosen the upper soil layer crust and to aggressively lift and distribute the chopped crop residue on the soil surface as the tillage implement is pulled through the field. The third tillage tool assembly is preferably a leveling board disposed longitudinally rearward of the second tillage tool assembly and adapted to drag over the soil surface thereby leaving the soil surface substantially smooth and ready for planting.

To the accomplishment of the above objects, features and advantages, this invention may be embodied in the form illustrated in the accompanying drawings, attention being called to the fact, however, that the drawings are illustrative only, and the changes may be made in the specific form illustrated and described within the scope of the appended claims.

BRIEF DESCRIPTION OF DRAWINGS

FIG. 14 illustrates the difference in crop root development achieved using traditional tillage tools and the present invention.

DETAILED DESCRIPTION

Figure 1:
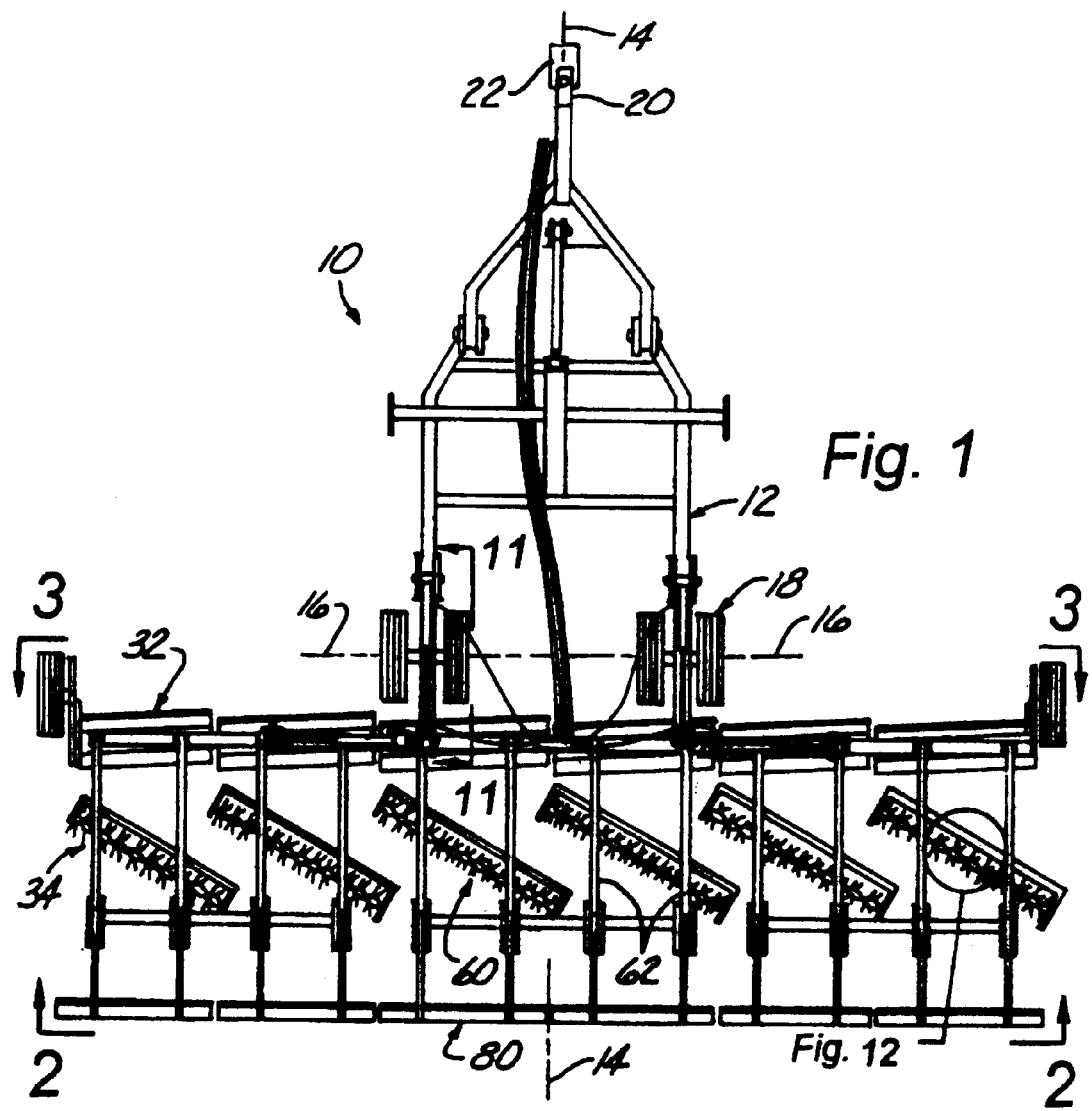
FIG. 1 is a top plan view of a preferred embodiment of the present invention showing the frame and tillage tools in a working position.

Referring to the drawings wherein like reference numerals designate similar or corresponding parts throughout the several views, FIG. 1 shows a top plan view of the preferred embodiment of the tillage implement 10 of the present invention. The preferred embodiment of the tillage implement 10 includes a frame 12 having a longitudinal axis 14 and a transverse axis 16. The frame 12 includes a pair of ground wheel assemblies 18 and is adapted to be pulled by a prime mover (not shown), such as a tractor, by securing the hitch attachment 20 disposed at the forward end of the frame 12 to the draw bar 22 of the prime mover.

Figure 10:
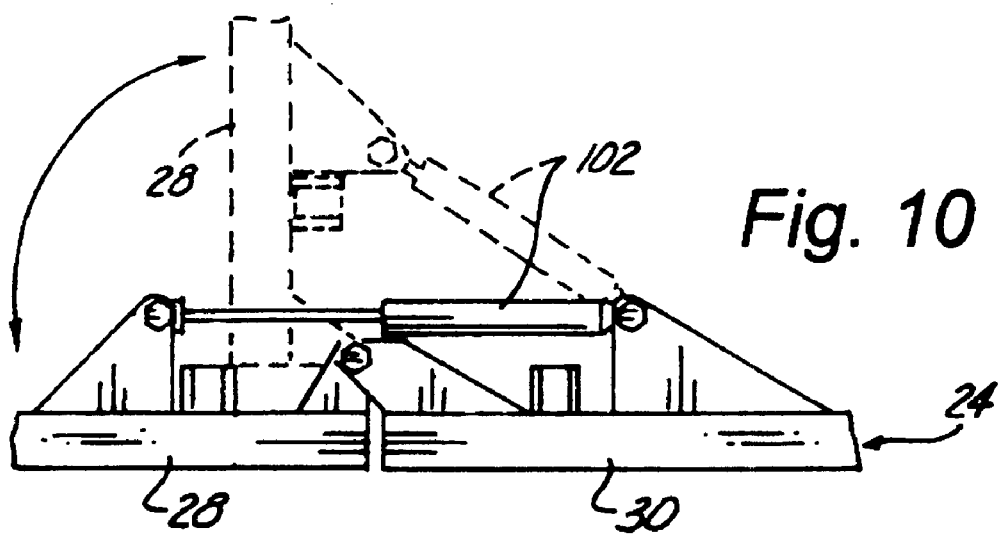
FIG. 10 is a detailed top plan view of the first or second actuator illustrating the movement of the toolbar between a working position and a transport position.

A toolbar 24 is secured to the wheeled frame 12. The toolbar 24 is preferably comprised of a first beam 26 and a second beam 28 pivotally secured to a third beam 30 as best viewed in FIG. 10. The third beam 30 is preferably pivotally secured to the wheeled frame 12 as best viewed in FIG. 11. The tool bar 24 operably supports at least three different tillage tool assemblies disposed in a spaced arrangement along the longitudinal axis 14 of the frame 12. As will be discussed in more detail later, the first tillage tool assembly 32 is preferably adapted to chop crop surface residue without tilling the soil below the depth that the seed is to be planted. The second tillage tool assembly 34 is preferably adapted to penetrate and loosen the soil crust and to lift and distribute the chopped crop residue on the soil surface. The third tillage tool assembly 36 is preferably adapted to drag over the soil surface thereby leaving the surface of the soil substantially smooth and ready for planting.

Figure 5:
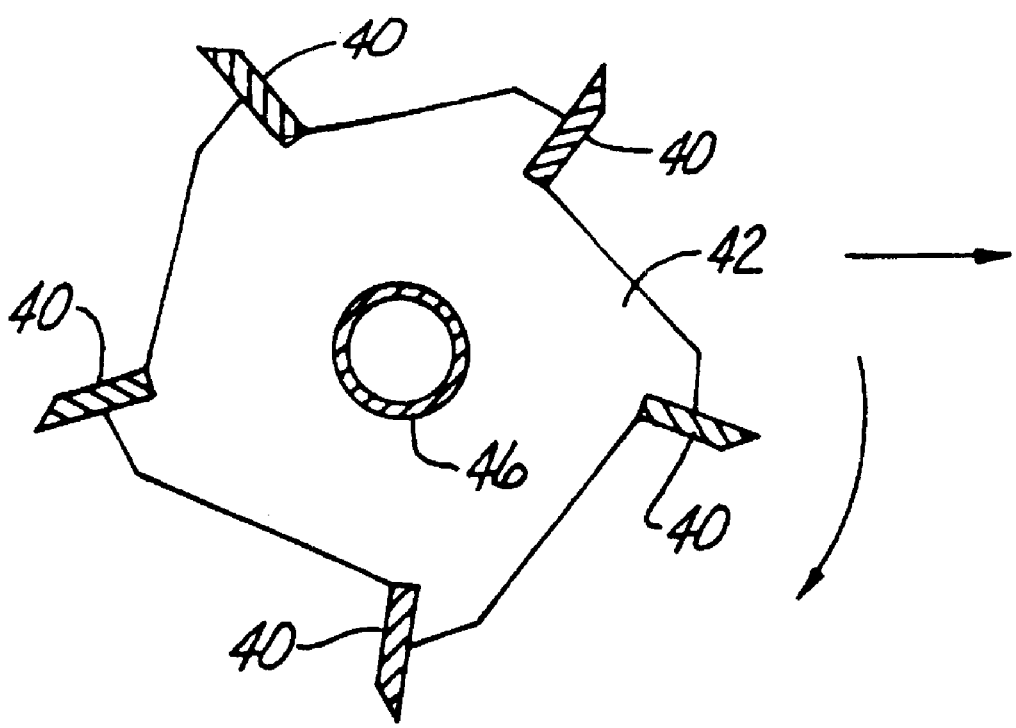
FIG. 5is a cross-sectional view of the preferred spiral reel assembly as viewed along lines 5—5 of FIG. 3.
Figure 12:
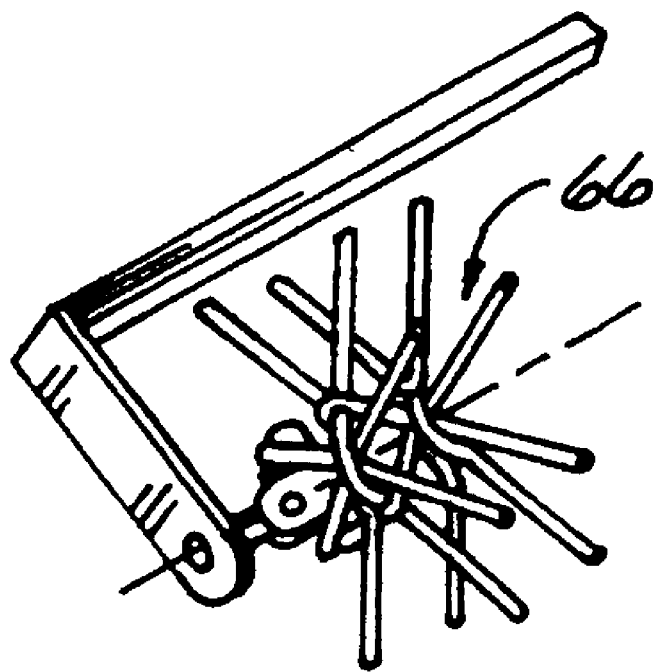
FIG. 12 is a detailed partial perspective view of the preferred prickle chain assembly.

It should be understood that the frame (FIGS. 5 and 12 may be any size and configuration as long as it is capable of operably supporting at least the three tillage tool assemblies 32, 34 and 36 designed to perform the steps of cutting and chopping the crop surface residue, aggressively lifting and distributing the chopped crop surface residue, and leveling the soil surface such that it is ready for planting. Additionally, it should be appreciated that other tillage tool assemblies may be added to the frame 12 before, after or in between any of the first, second or third tillage tool assemblies 32, 34 and 36 as long as these other tillage tool assemblies do not counter the purpose of the present invention, which is to provide a one-pass tillage implement that maintains uniform soil density throughout the crop root zone by not tilling the soil below seed planting depth.

Figure 3:
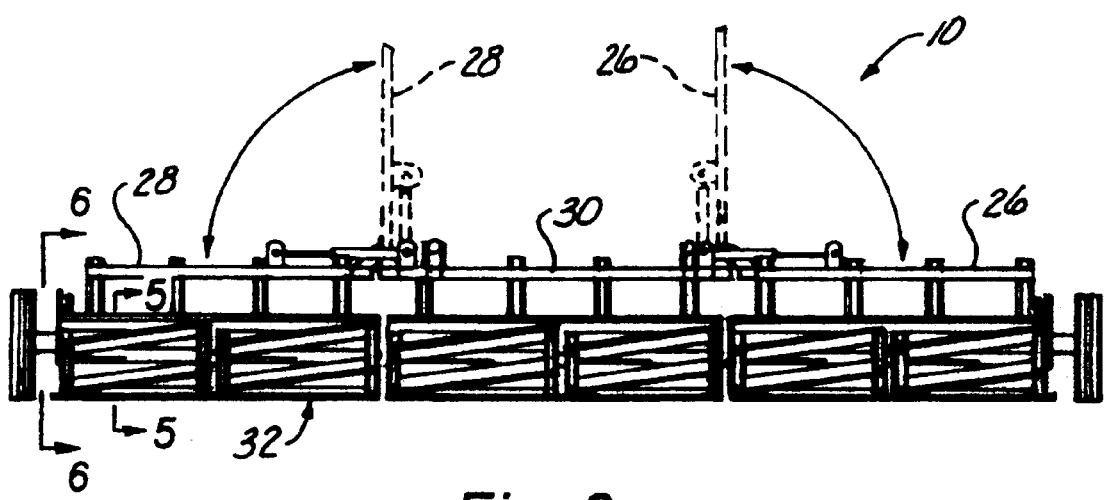
FIG. 3 is a front elevation view of the preferred embodiment as viewed along lines 3—3 of FIG. 1, and further showing the frame being moveable from the working position to a transport position-.
Figure 6:
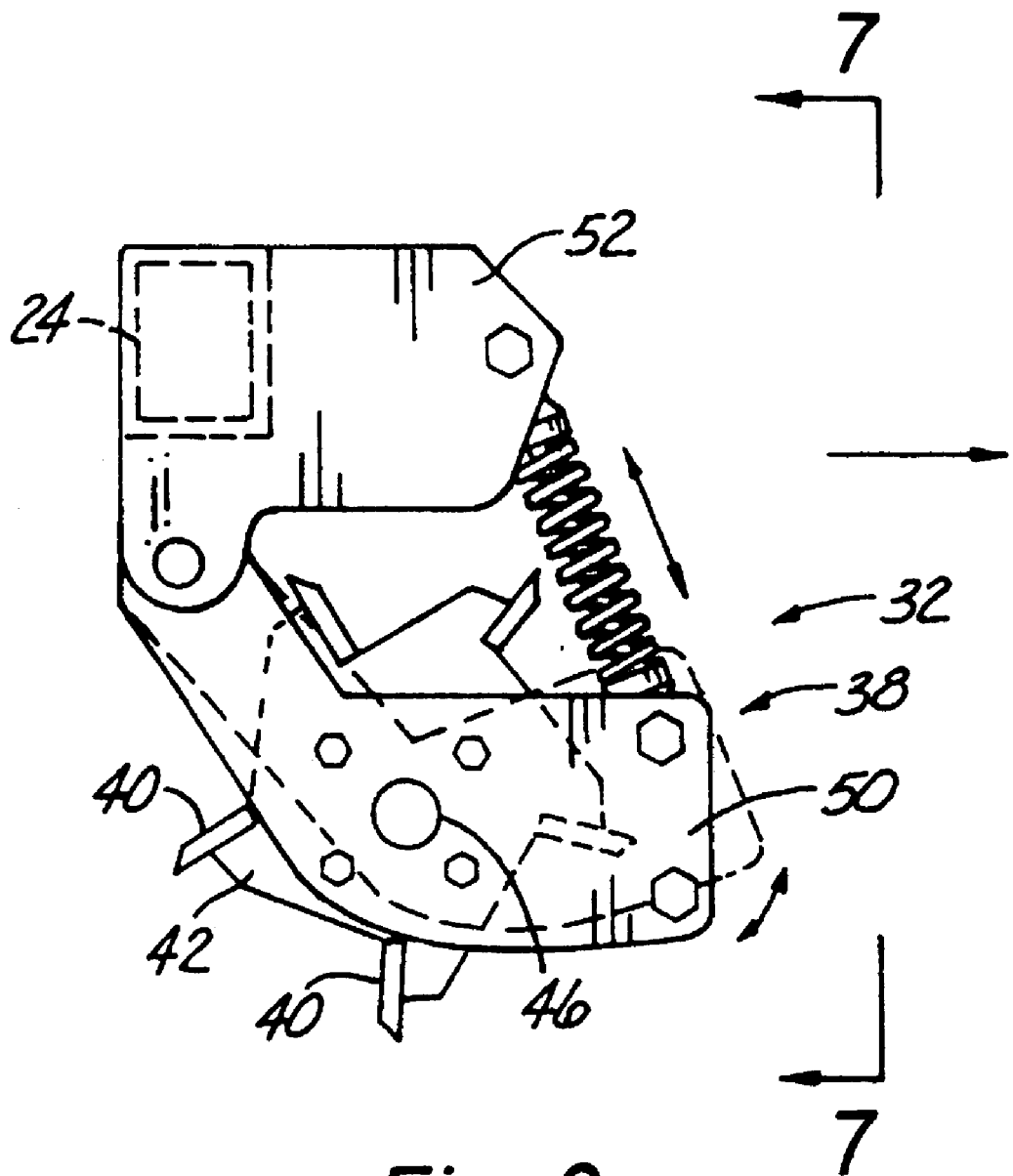
FIG. 6is a detailed side elevation view of the preferred spiral reel assembly as viewed along lines 6—6 of FIG. 3.
Figure 7:
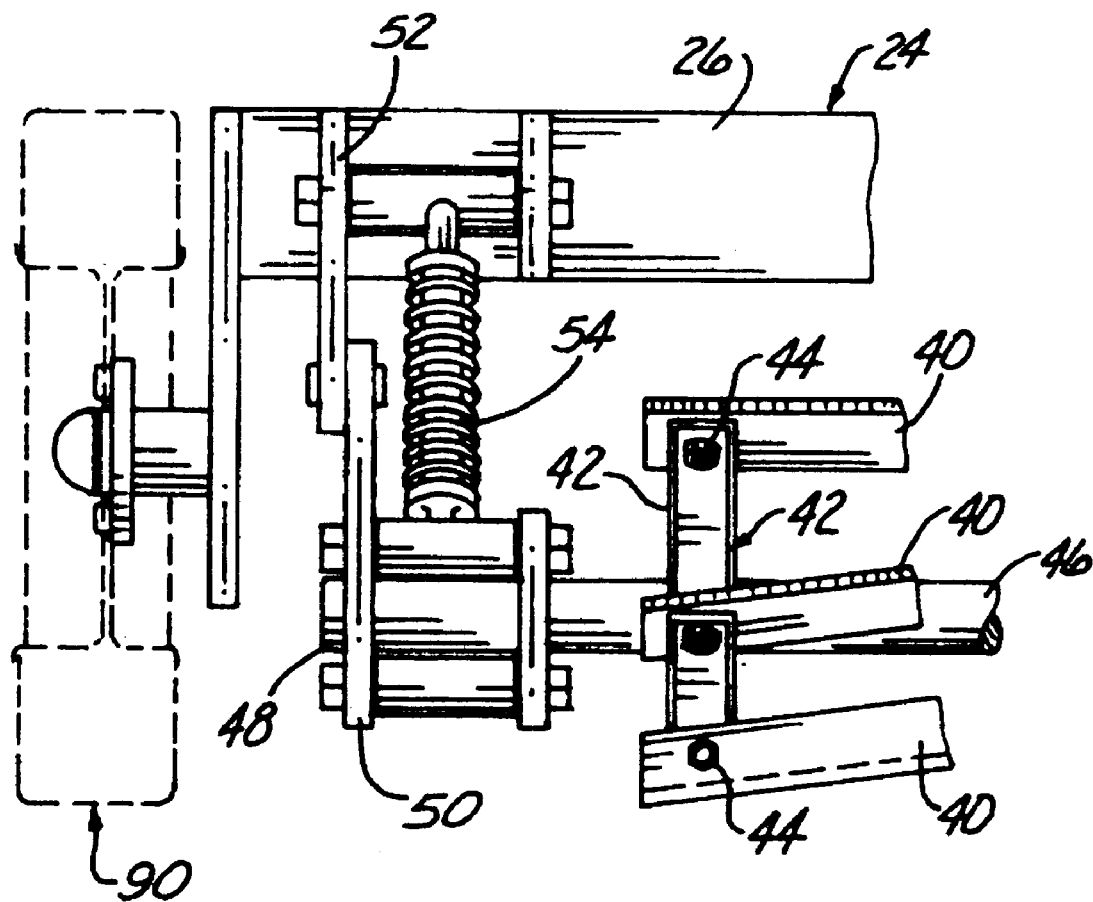
FIG. 7 is a detailed partial front elevation view of the preferred spiral reel assembly as viewed along lines 7—7 of FIG. 6.

As best viewed in FIG. 3, the first tillage tool assembly 32 is preferably comprised of a plurality of adjacently spaced spiral reel assemblies 38. Each spiral reel assembly 38 preferably includes five hardened steel blades 40 as best viewed in FIG. 5. The blades 40 are preferably rigidly fixed to a star-shaped gusset plates 42 by threaded connectors 44 as best illustrated in FIGS. 5 and 7. The star-shaped gusset 42 is preferably welded to a rotatable shaft 46. Each end of the rotatable shaft 46 is supported by a hub 48 (FIGS. 6 and 7) secured to a bracket 50. The bracket 50 is preferably pivotally attached to an upper gusset 52 (FIGS. 6 and 7) fixed to the tool bar 24. A spring 54 extends between bracket 50 and gusset 52 to bias the steel blades 40 against the soil. Those skilled in the art readily appreciated that there are various types of tools that may be used to cut and chop crop surface residue and therefore the first tillage tool assembly 32 of the present invention should not be considered as being limited to the spiral reel assembly 38 as disclosed herein as the preferred embodiment for accomplishing the object of cutting and chopping the crop surface residue.

Figure 8:
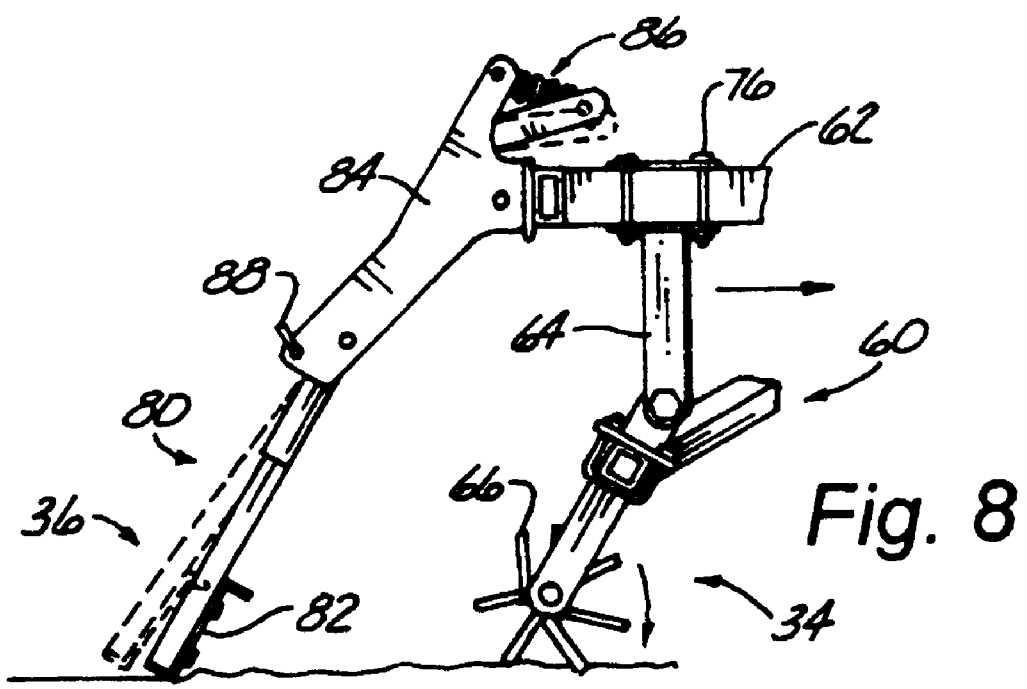
FIG. 8is a detailed side elevation view of the preferred leveling bar and prickle chain tillage tools as shown in FIG. 4.
Figure 13:
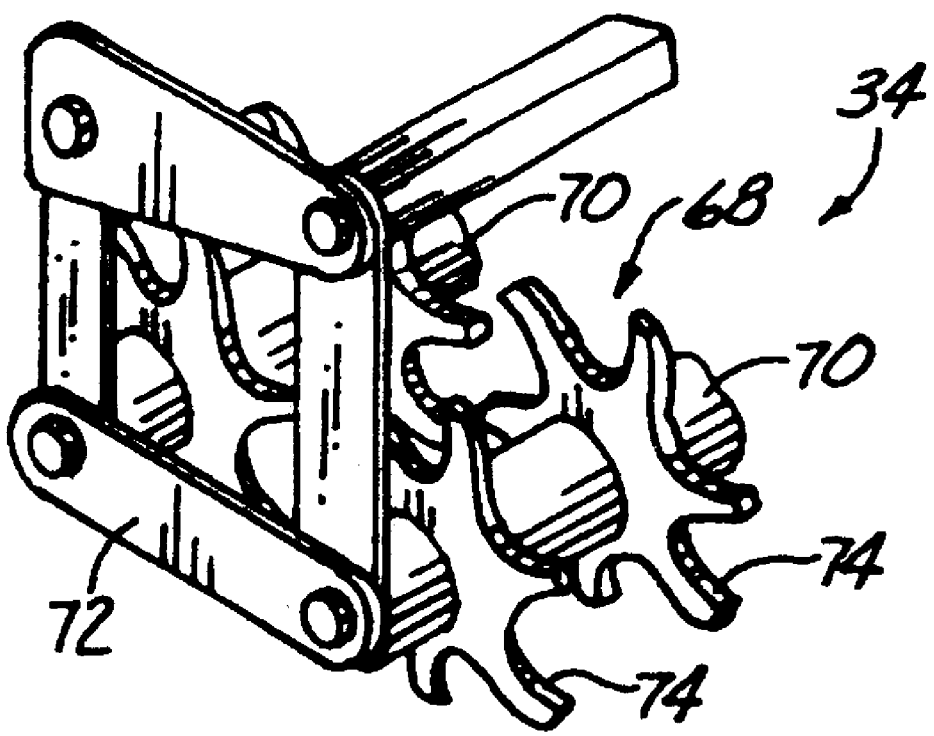
FIG. 13 is a detailed partial perspective view of an alternative rotary spider wheel harrow assembly for use with the present invention.

Referring to FIGS. 1 and 8, the second tillage tool assembly 34 is disposed longitudinally rearward of the first tillage tool assembly 32. The second tillage tool assembly 34 is preferably comprised of a plurality of adjacently disposed rotary harrow assemblies 60. Each rotary harrow assembly 60 is preferably supported by a pair of longitudinal bars 62 secured at one end to the toolbar 24. Extending from each longitudinal bar 62 is a bracket member 64 which preferably supports a prickle chain harrow 66 as best shown in FIG. 12, and as disclosed in U.S. Pat. No. 5,000,270 and U.S. Pat. No. 5,794,712, the specification and drawing figures of which are incorporated herein by reference. Alternatively, the bracket members 64, may support other types of rotary harrow assemblies 60, such as spider wheel rotary harrows 68 as shown in FIG. 13. The preferred spider wheel rotary harrow 68 is preferably comprised of a pair of shafts 70 rotatably secured to a four bar linkage 72 as illustrated in FIG. 13. Secured to each rotatable shaft 70 are a plurality of spider wheels 74.

The second tillage tool assemblies 34 are preferably angularly adjustable with respect to the direction of travel of the implement 70 by loosening and adjusting the clamps 76 (FIG. 5) along the length of the longitudinal bars 62 such that the angle of the assembly 34 is at more or less of an oblique angle with respect to the longitudinal or transverse axis 14, 16 of the frame 12. Alternatively, as opposed to manually adjusting the second tillage tool assembly 34 as just described, the assembly 34 may operably supported from the frame 12 to enable the assembly 34 to be angularly adjusted by employing an actuator, such as a hydraulic cylinder, to allow the operator to adjust the angle of the assembly 34 on the go.

Figure 9:
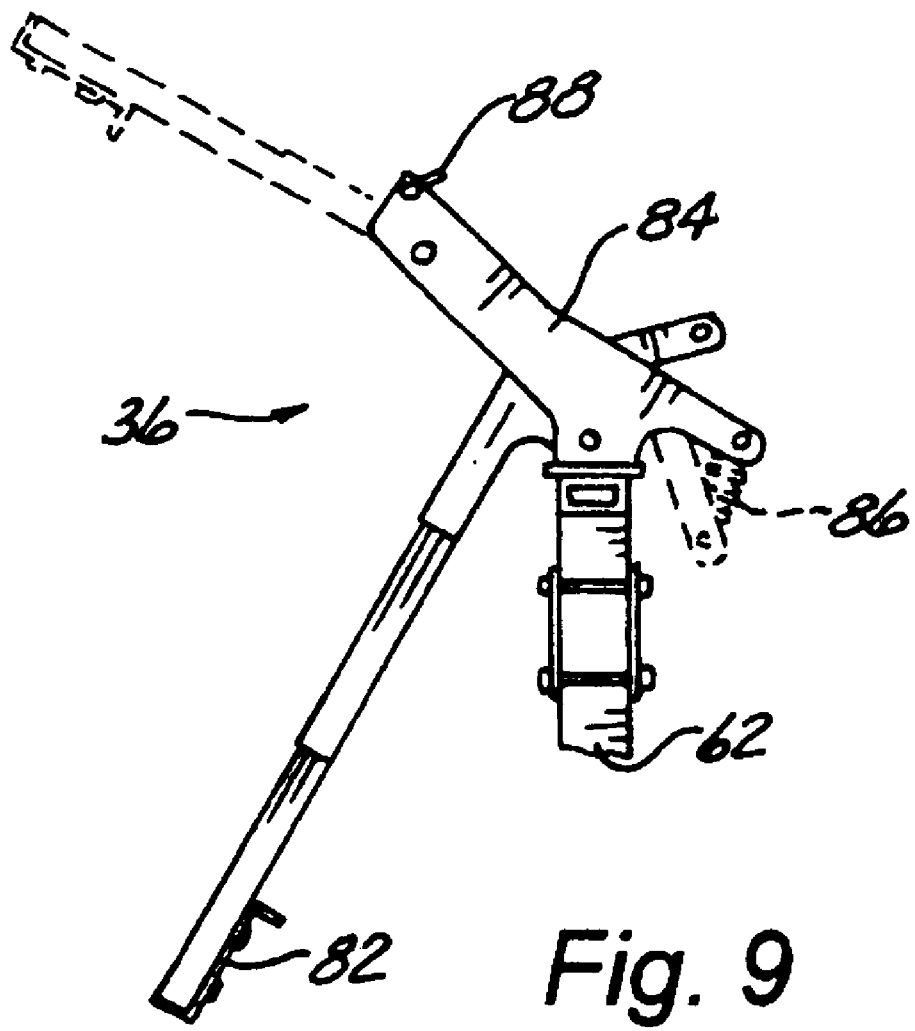
FIG. 9 is a detailed side elevation view of the preferred leveling bar assembly, illustrating the leveling bar assembly being moveable between a working position and a transport position.

Referring again to FIGS. 1 and 8, the third tillage tool assembly 36 is disposed longitudinally rearward of the second tillage tool assembly 34. The third tillage tool assembly 36 is preferably comprised of a plurality of adjacently disposed leveling board assemblies 80. Each leveling board assembly 80 preferably includes a leveling board 82 secured to a pair of collapsing bracket assemblies 84 secured to the longitudinal bar 62. The collapsing bracket assembly 84 preferably includes a spring mechanism 86 to bias the leveling board 82 against the soil to firm and level the soil as it passes over the soil surface. The collapsing bracket assembly 84 preferably enables the leveling boards 82 to be folded for easier transporting of the implement 10 by removing a pin member 88 and detaching one end of the spring mechanism 86 and folding the assembly as shown in FIG. 9.

Referring to FIGS. 1 and 7, a gauge wheel assembly 90 is preferably located at the ends of the tool bar 24 and preferably supported by a hub 92 rotatably mounted on a bracket 94. The bracket 94 is preferably vertically adjustable, by any conventional means in order to control the depth that the blades 40 of the spiral reel assembly 38 may penetrate the soil surface.

Figure 2:
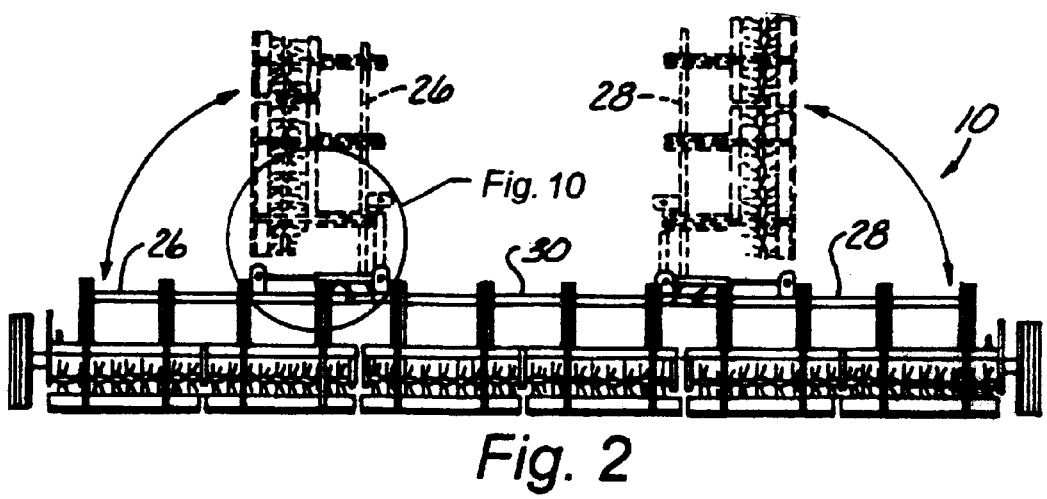
FIG. 2 is a rear elevation view of the preferred embodiment as viewed along lines 2—2 of FIG. 1, and further showing the frame being moveable from the working position to a transport position.
Figure 4:
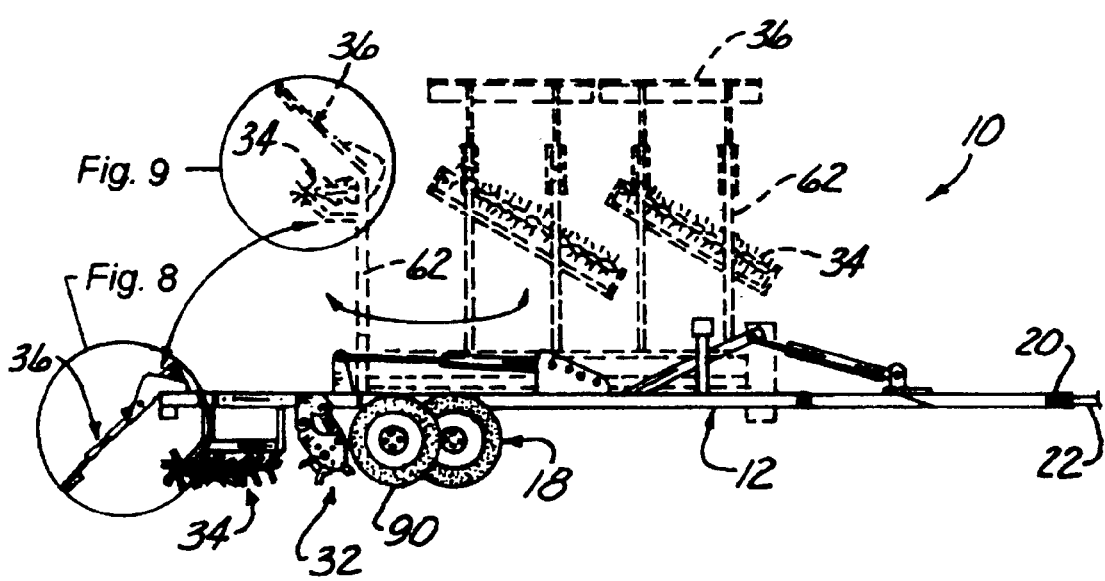
FIG. 4 is a side elevation view of the embodiment of FIG. 1, and further showing the frame being moveable from the working position to a transport position.
Figure 11:
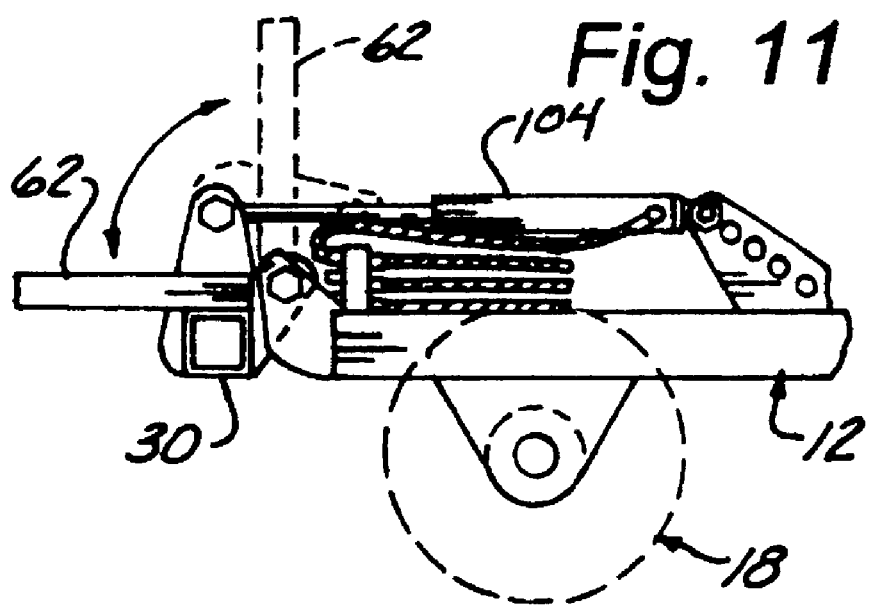
FIG. 11 is a side elevation view of the third actuator, illustrating the movement of the toolbar between a working position and a transport position.

Finally, in order for the tillage implement of the present invention 10 to be easily transported from field to field, it is preferred that the tool bar 24 is capable of being folded from the working position to a transport position as shown in FIGS. 2, 3 and 4. As best viewed in FIG. 10, a first actuator 100, such as a hydraulic cylinder, is pivotally secured at one end to the first beam 26 and at its other end to the third beam 30. A second actuator 702 is similarly pivotally connected at one end to the second beam 28 and the third beam 30. As illustrated in FIGS. 2, 3 and 8, actuation of the actuator causes the beams 26, 28 to fold upwardly from the working position to the transport position. A third pair of actuators 104 (as shown in FIGS. 1 and 11) pivotally raises the third beam 30 and thereby causing the second and third beams 26, 28 attached thereto to pivot forwardly as shown in FIG. 4.

In operation, the tillage implement 10 is transported to a field to be prepared for planting. The implement 10 is unfolded from the transport position (FIG. 4) to the working position (FIG. 1) by extending the actuators 100, 102, 104. As the implement 10 traverses the field, the preferred rotary spiral reel assembly 38, of the first tillage tool assembly 32, cuts and chops the crop surface residue. It should be appreciated that the blades 40 of the assembly 38 are caused to rotate due to their engagement with the soil and the crop surface residue as the implement 10 moves forward. The gauge wheel assembly 90 is preferably vertically adjusted such that the blades 40 do not penetrate the surface of the soil more than one to two inches such that the soil remains untilled at seed planting depths (typically three to four inches).

The preferred prickle chain harrow 66 or rotary spider wheel harrow 68 of the second tillage tool 34, rotates over the soil surface to aggressively lift and distribute the cut and chopped crop surface residue and to break up the surface crust. It should be appreciated that the prickle chain 66 or rotary spider wheel 68 will only penetrates the upper one to two inches of the soil surface, such that the soil remains untilled at seed planting depths.

Finally, as the soil and chopped crop surface residue passes under the preferred spring biased leveling board 82 of the third tillage tool 36 the soil surface is firmed and leveled. Thereby leaving behind a substantially smooth soil surface ready for planting with chopped crop surface residue evenly distributed thereon.

The seedbed prepared using the tillage implement 10 of the present invention provides a seedbed having uniform soil density at seed planting depths resulting in the difference in root structure as shown in FIG. 14 between seedbeds prepared using traditional tillage tools (as shown on the left) and seedbeds prepared using the tillage implement of the present invention 10 (as shown on the right). Thus a seedbed prepared using the tillage tools of the present invention 10 results in greater root development, improved plant health and greater yields.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A one-pass field tillage implement that leaves the soil untilled at and below seed planting depth, thereby eliminating soil density changes at and below seed planting depth for greater root development and improved plant health, the tillage implement comprising:

a wheeled frame having a longitudinal axis and a transverse axis and adapted to be pulled by a prime mover;

a toolbar operably secured to said wheeled frame for supporting at least three longitudinally spaced tillage tool assemblies, including, a first tillage tool assembly disposed substantially transverse to said longitudinal axis, said first tillage tool assembly adapted to cut and chop crop surface residue as the tillage implement is pulled through the field, while leaving the soil untilled at and below seed planting depth;

a second tillage tool assembly disposed longitudinally rearward of said first tillage tool assembly, said second tillage tool assembly adapted to penetrate and loosen an upper crust soil layer and to lift and distribute said chopped crop residue on said soil surface as the tillage implement is pulled through the field, while leaving the soil untilled at a depth at and below seed planting depth;

a third tillage tool assembly disposed longitudinally rearward of said second tillage tool assembly, said third tillage tool assembly adapted to drag over said soil surface thereby leveling said soil surface such that said soil surface is substantially smooth and ready for planting; a gauge wheel assembly operably secured to said tool bar, said gauge wheel assembly adapted to limit tillage depth of said soil to an elevation above seed planting depth, thereby eliminating soil density changes at and below seed planting depth, whereby plant root development and plant health are improved.

2. The one-pass tillage implement of claim 1 wherein said toolbar is movable between a first transport position and a second working position.

3. The one-pass tillage implement of claim 2 wherein said first tillage tool assembly is comprised of a plurality of blades spaced radially about a rotating shaft rotatably and operably supported by said frame.

4. The one-pass tillage implement of claim 3 wherein said plurality of radially spaced blades are disposed in a spiral configuration about said rotating shaft.

5. The one-pass tillage implement of claim 3 wherein said second tillage tool assembly is comprised of a plurality individual, adjacently spaced, rolling harrow assemblies disposed across a transverse width of said frame in an overlapping relation.

6. The one-pass tillage implement of claim 5 wherein each of said individual, adjacently spaced, rolling harrow assemblies is movable between a first position in which each said individual rolling harrow assemblies are disposed substantially parallel to said transverse axis of said frame to a second position in which each said individual rolling harrow assemblies are disposed at an oblique angle to said transverse axis of said frame.

7. The one-pass tillage implement of claim 6 wherein said rolling harrow assemblies are comprised of prickle chain rotary harrow assemblies.

8. A one-pass field tillage implement that leaves the soil untilled at and below seed planting depth, thereby eliminating soil density changes at and below seed planting depth for greater root development and improved plant health, the tillage implement, comprising:

a wheeled frame having a longitudinal axis and a transverse axis and adapted to be pulled by a prime mover;

a toolbar operably secured to said wheeled frame;

a rotating reel assembly operably supported by said toolbar and disposed substantially transverse to said longitudinal axis, said rotating reel assembly adapted to cut and chop crop surface residue as the tillage implement is pulled through the field, while leaving the soil untilled at and below seed planting depth;

a rolling harrow assembly operably supported by said toolbar and disposed longitudinally rearward of said rotating reel assembly, said rolling harrow assembly adapted to penetrate and loosen an upper crust soil layer and to lift and distribute said chopped crop residue on said soil surface as the tillage implement is pulled through the field, while leaving the soil untilled at and below seed planting depth;

a leveling board assembly operably supported by said toolbar and disposed longitudinally rearward of said rolling harrow assembly, said leveling board assembly adapted to drag over said soil surface thereby leveling said soil surface such that said soil surface is substantially smooth and ready for planting;

a gauge wheel assembly operably secured to said tool bar, said gauge wheel assembly adapted to limit tillage depth of said soil to an elevation above seed planting depth, thereby eliminating soil density changes at and below seed planting depth, whereby plant root development and plant health are improved.

9. The one pass tillage implement of claim 8 wherein said toolbar is movable between a first transport position and a second working position.

10. The one-pass tillage implement of claim 9 wherein said rotating reel assembly is comprised of a plurality of blades spaced radially about a rotating shaft rotatably and operably supported by said frame.

11. The one-pass tillage implement of claim 10 wherein said plurality of radially spaced blades are disposed in a spiral configuration about said rotating shaft.

12. The one-pass tillage implement of claim 11 wherein said rolling harrow assembly is comprised of a plurality individual adjacently spaced rolling harrow assemblies disposed across a transverse width of said frame in an overlapping relation.

13. The one-pass tillage implement of claim 12 wherein each of said individual adjacently spaced rolling harrow assemblies is movable between a first position in which each said individual rolling harrow assemblies are disposed substantially parallel to said transverse axis of said frame to a second position in which each said individual rolling harrow assemblies are disposed at an oblique angle to said transverse axis of said frame.

14. The one-pass tillage implement of claim 13 wherein said rolling harrow assemblies are comprised of prickle chain rotary harrow assemblies.

15. An improved tillage implement comprising (i) a wheeled frame having a longitudinal axis and a transverse axis and adapted to be pulled by a prime mover; (ii) a toolbar secured to said frame and moveable between a first transport position and a second working position; (iii) a rotating spiral blade reel assembly operably supported by said toolbar and disposed substantially transverse to said longitudinal axis, said rotating spiral blade reel assembly adapted to cut and chop crop surface residue as the tillage implement is pulled through the field; and (iv) a leveling board assembly operably supported by said toolbar and disposed longitudinally rearward of said rotating spiral blade reel assembly, said leveling board assembly adapted to drag over said soil surface thereby leaving said soil surface substantially smooth and ready for planting, the improvement comprising:

a rolling harrow assembly operably supported by said toolbar and disposed longitudinally rearward of said rotating spiral blade reel assembly and longitudinally forward of said leveling board assembly, said rolling harrow assembly adapted to penetrate and loosen only an upper crust soil layer, and further adapted to lift and distribute said chopped crop residue on said soil surface before said soil is substantially leveled by said leveling board assembly as the tillage implement is pulled through the field; and a gauge wheel assembly operably secured to the tool bar, said gauge wheel assembly adapted to limit tillage depth of said soil to an elevation above seed planting depth, thereby eliminating soil density changes at and below seed planting depth, whereby plant root development and plant health are improved.

16. The one-pass tillage implement of claim 15 wherein said rolling harrow assembly is comprised of a plurality individual, adjacently spaced rolling harrow assemblies disposed across a transverse width of said frame in an overlapping relation.

17. The one-pass tillage implement of claim 16 wherein each of said individual adjacently spaced rolling harrow assemblies is movable between a first position in which each said individual rolling harrow assemblies are disposed substantially parallel to said transverse axis of said frame to a second position in which each said individual rolling harrow assemblies are disposed at an oblique angle to said transverse axis of said frame.

18. The one-pass tillage implement of claim 17 wherein said rolling harrow assemblies are comprised of prickle chain rotary harrow assemblies.

19. A one-pass tillage method for preparing a seedbed for planting which eliminates soil density changes at and below seed planting depth for greater root development, improved plant health and greater yields, said one-pass method comprising the steps of:

first, cutting and chopping crop residue on a soil surface, while leaving said soil untilled at and below seed planting depth;

second, penetrating and loosening only an upper crust of said soil with a tillage tool adapted to lift and redistribute said chopped crop surface residue on said soil surface, while leaving said soil untilled at and below seed planting depth; third, leveling said soil surface such that said soil is ready for planting; said first, second and third steps being performed in one-pass by a single implement being pulled by a prime mover and wherein said implement is adapted to limit tillage depth of said soil to an elevation above seed planting depth, whereby said one-pass method tillage method conditions only an upper surface of said soil thereby maintaining uniform soil density at and below seed depth for greater root development improved plant health and greater yields.

20. The one-pass tillage method of claim 19, wherein said method is performed at field speeds approximately between 8 and 12 miles per hour.

21. The one-pass tillage method of claim 19, wherein said method is performed by a tillage implement comprising:

a wheeled frame having a longitudinal axis and a transverse axis anti adapted to be pulled by the prime mover;

a toolbar secured to said wheeled frame; a rotating reel assembly operably supported by said toolbar and disposed substantially transverse to said longitudinal axis, said rotating reel assembly performing said step of cutting and chopping said crop surface residue as the tillage implement is pulled through the field;

a rolling harrow assembly operably supported by said toolbar and disposed longitudinally rearward of said rotating reel assembly, said rolling harrow assembly performing said step of penetrating and loosening only said upper crust of said soil and lifting and distributing said chopped crop residue on said soil surface as the tillage implement is pulled through the field;

a leveling board assembly operably supported by said toolbar and disposed longitudinally rearward of said rolling harrow assembly, said leveling board assembly performing said step of leveling said soil surface such that said soil is ready for planting as the tillage implement is pulled through the field.

22. The one-pass tillage method of claim 21 wherein said toolbar is movable between a first transport position and a second working position.

23. The one-pass tillage method of claim 22, wherein said rotating reel assembly is comprised of a plurality of blades spaced radially about a rotating shaft rotatably and operably supported by said frame.

24. The one-pass tillage method of claim 23 wherein said plurality of radially spaced blades are disposed in a spiral configuration about said rotating shaft.

25. The one-pass tillage method of claim 24 wherein said rolling harrow assembly is comprised of a plurality individual adjacently spaced rolling harrow assemblies disposed across a transverse width of said frame in an overlapping relation.

26. The one-pass tillage method of claim 25 wherein each of said individual adjacently spaced rolling harrow assemblies is movable between a first position in which each said individual rolling harrow assemblies are disposed substantially parallel to said transverse axis of said frame to a second position in which each said individual rolling harrow assemblies are disposed at an oblique angle to said transverse axis of said frame.

27. The one-pass tillage method of claim 26 wherein said rolling harrow assemblies are comprised of prickle chain rotary harrow assemblies.

28. A one-pass field tillage implement, comprising:

a wheeled frame having a longitudinal axis and a transverse axis and adapted to be pulled by a prime mover;

a toolbar operably secured to said wheeled frame, said toolbar operably supporting a plurality of adjacently spaced spiral reel assemblies disposed substantially transverse to said longitudinal axis, each of said plurality of adjacently spaced spiral reel assemblies adapted to cut and chop crop surface residue as the tillage implement is pulled through the field, said spiral real assemblies being limited to a depth of penetration in the soil above seed planting depth;

said toolbar further operably supporting a plurality of adjacently spaced rolling harrow assemblies, each of said adjacently spaced rolling harrow assemblies movable between a first position substantially transverse to said longitudinal axis and a second position oblique to said longitudinal axis, said rolling harrow assemblies disposed longitudinally rearward of said spiral reel assemblies, each of said rolling harrow assemblies adapted to penetrate and loosen an upper crust soil layer and to lift and distribute said chopped crop residue on said soil surface as the tillage implement is pulled through the field, said rolling harrow assemblies being limited to a depth of penetration in the soil above seed planting depth;

said toolbar further operably supporting a plurality of adjacently spaced leveling boards disposed substantially transverse to said longitudinal axis and longitudinally rearward of said rolling harrow assemblies, each of said leveling board assemblies adapted to drag over said soil surface thereby leveling said soil surface such that said surface is substantially smooth and ready for planting.

* * * * *